Figure 1:
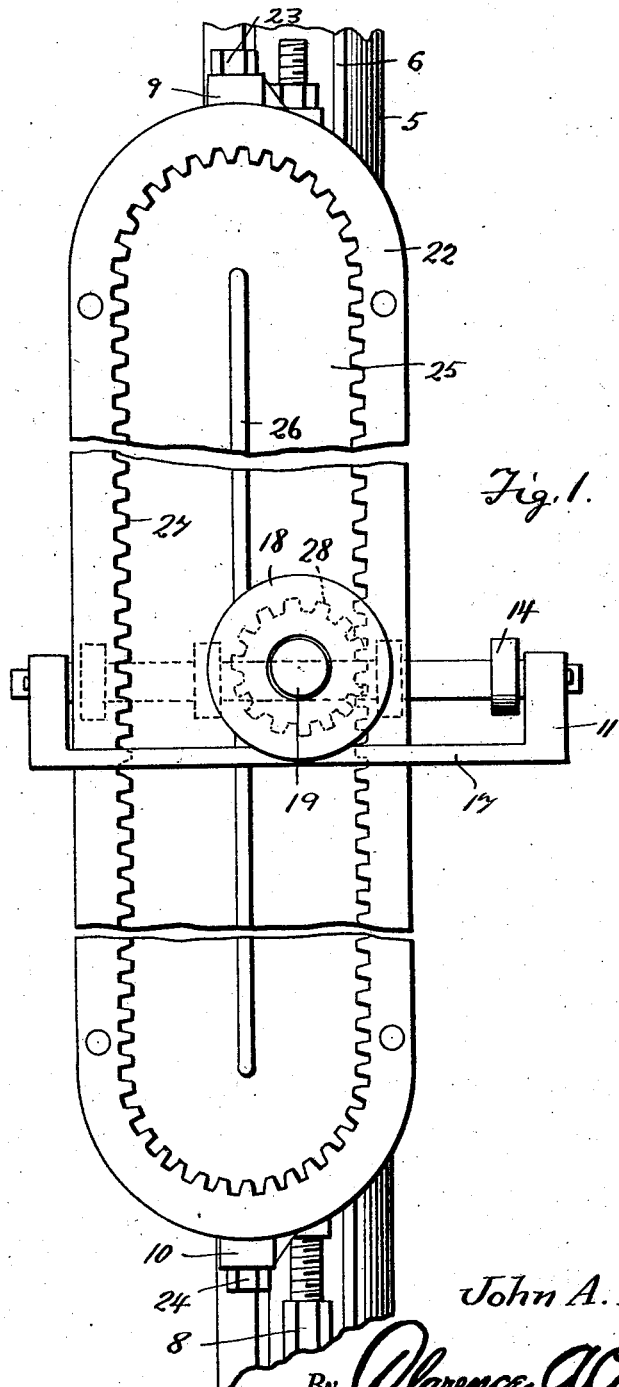

April 5, 1927.　　　　J. A. NITCHIE　　　　1,623,490
POWER TRANSMISSION DEVICE FOR PUMPS
Filed June 1, 1926　　　2 Sheets-Sheet 1

Inventor
John A. Nitchie
By Clarence A. O'Brien
Attorney

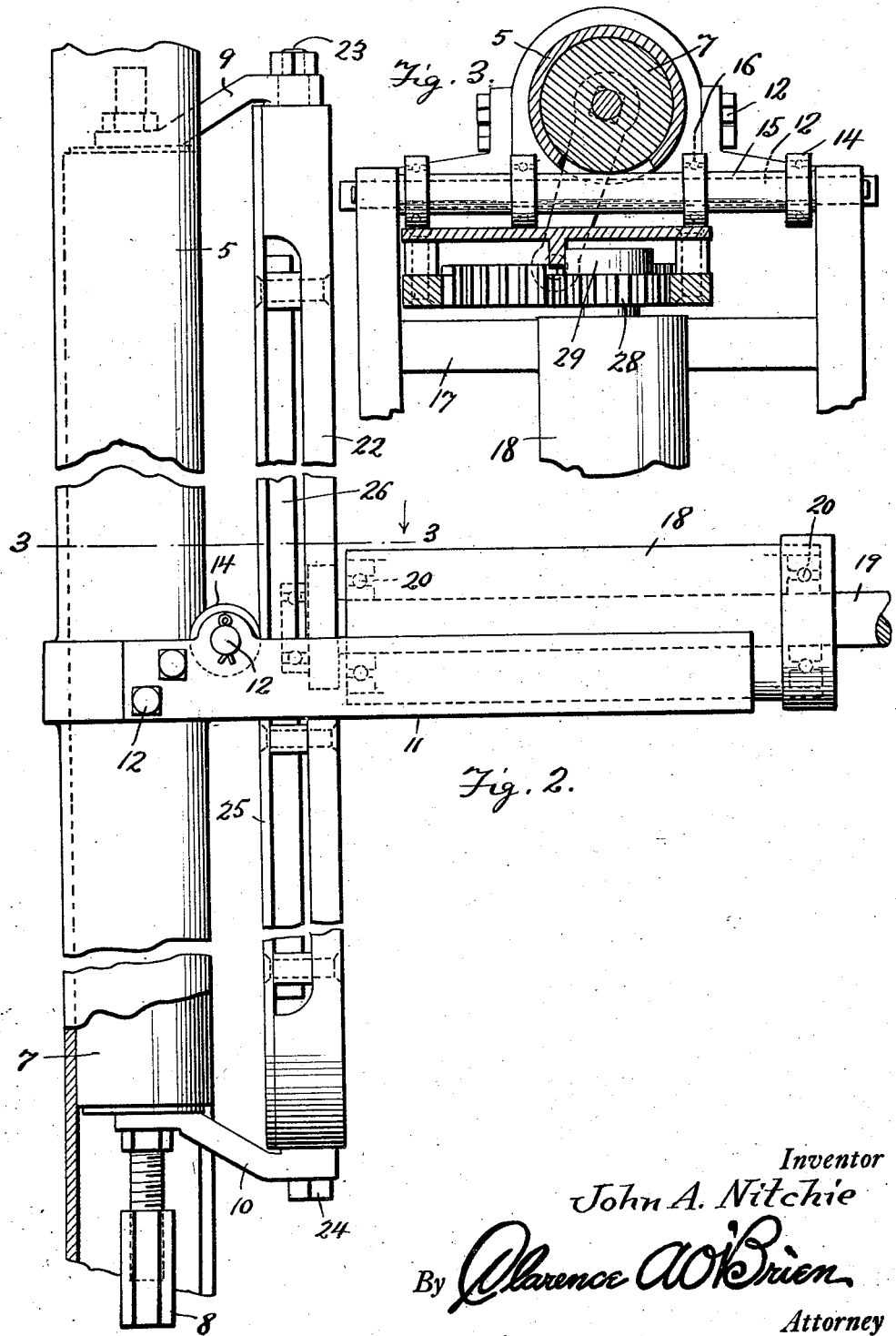

Patented Apr. 5, 1927.

1,623,490

UNITED STATES PATENT OFFICE.

JOHN A. NITCHIE, OF ELM CREEK, NEBRASKA.

POWER-TRANSMISSION DEVICE FOR PUMPS.

Application filed June 1, 1926. Serial No. 113,016.

The present invention relates to a power transmission device, particularly adapted for use with pumps, and has for its principal object to provide a structure which is capable of translating rotary motion into rectilinear motion.

Another very important object of the invention is to provide a device of this nature which is simple in its construction, inexpensive to manufacture, strong, durable, highly efficient and reliable, compact, convenient, highly accessible, easy to assemble and disassemble, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 1 is an elevation of the contrivance embodying the features of my invention, Fig. 2 is another elevation thereof, taken at right angles to showing of Fig. 1, and Fig. 3 is a transverse horizontal section taken therethrough, substantially on the line 3—3 of Fig. 2.

Referring to the drawing in detail, it will be seen that the numeral 5 denotes a vertically disposed cylinder having a longitudinally extending slot 6 provided therein. A cylindrical slide member 7 is mounted for longitudinal sliding motion in the casing 5 and also is permitted to rock therein. A suitable coupling structure 8, of any preferred construction is mounted on the lower end of the slide member 7 for attachment to a pump rod or the like to impart rectilinear vertical motion thereto.

Arms 9 and 10 project from the upper and lower ends respectively of the slide member 7 through the slide slot 6. A frame 11 is fixedly mounted as at 12 on an intermediate portion of the cylindrical casing 5 and extends laterally therefrom. A shaft 12 is mounted in the frame 11 to extend transversely thereof, and has a plurality of rollers 14 mounted for rotation thereon, being spaced apart by suitable spacing sleeves 15. These rollers 14 have suitable ball bearings 16 therein to minimize friction as much as possible.

A cradle cross member 17 is mounted in the frame 11 and supports a cylindrical bearing 18 in which is journaled a drive shaft 19, suitable ball bearing structures 20 being incorporated in the cylindrical bearing 18 so that the shaft 19 will rotate therein with a minimum amount of friction. A rack frame 22 is mounted for vertical movement through the frame 11 between one end of the bearing 18 and the rollers 14, and the upper end of this rack frame 22 is pivotally engaged as at 23 with the arm 9 and the bottom end thereof is pivotally engaged as at 24 with the arm 10.

A back plate 25 is fixed on the rack frame 22 and has a longitudinally extending rail 26 within the rack frame. This rack frame 22 is provided with an internal continuous rack 27 with which is meshed a pinion 28 fixed on the shaft 19. This pinion 28 is provided with a roller extension 29 engageable with the rail 26.

In using this contrivance, the shaft 19 may be rotated from any suitable source of power such as from a windmill, thereby imparting rotary motion to the pinion 28 which will impart an up and down movement to the rack frame 22, which motion will be imparted to the slide member 7 through the arms 9 and 10, which will permit the necessary side movement in the rack frame 22 as the pinion 28 shifts from one side to the other thereof. Considerable leverage is thus obtained, and the device will operate with efficiency so as to require very little oiling. All the parts of the mechanism are accessible and are capable of being assembled very easily, or disassembled.

It is thought that the construction, operation, and advantages of the invention will be readily apparent to those skilled in this art without a more detailed description thereof. The present embodiment of the invention has been disclosed in detail, merely by way of example since in actual practice it attains the features of advantage enumerated as desirable in the statement of the invention and the above description.

Numerous changes in the details of construction, and in the combination and arrangement of parts may be resorted to without departing from the spirit or scope of the invention as herein claimed, or sacrificing any of its advantages.

Having thus described my invention, what I claim as new is:—

1. A power transmitting device including, in combination, a cylindrical casing having a longitudinal slot, a cylindrical slide member rockable and slidable in the casing, a pair of arms, one attached to each end of the slide member and projecting through the slot, a frame attached to the casing and extending laterally therefrom, a shaft journaled transversely in the frame, rollers on the shaft, a rack frame formed with a continuous internal rack and pivotally engaged at its ends with the arms and movable through the first mentioned frame, a plate secured to the rack frame and having a longitudinal rail extending in the rack frame and adapted to bear against the rollers, a pinion meshing with the rack and formed with a roller extension engaging the rail, a bearing on the first mentioned frame, a driving shaft journaled in the bearing and fixed to the pinion.

2. A power transmitting device including, in combination a cylindrical casing having a longitudinal slot, a cylindrical slide member rockable and slidable in the casing, a pair of arms, one attached to each end of the slide member and projecting through the slot, a frame attached to the casing and extending laterally therefrom, a rack frame formed with a continuous internal rack, and pivotally engaged at its ends with the arms and movable through the first mentioned frame, a plate secured to the rack frame and having a longitudinal rail extending in the rack frame, a pinion meshing with the rack frame and formed with a roller extension engaging the rail, a bearing on the first mentioned frame, a driving shaft journaled in the bearing and fixed to the pinion.

3. A power transmitting device including, in combination, a cylindrical casing having a longitudinal slot, a cylindrical slide member rockable and slidable in the casing, a pair of arms, one attached to each end of the slide member and projecting through the slot, a frame attached to the casing and extending laterally therefrom, a shaft journaled transversely in the frame, rollers on the shaft, a rack frame formed with a continuous internal rack and pivotally engaged at its ends with the arms and movable through the first mentioned frame and engageable with the rollers on the shaft, a pinion meshing with the rack, means for holding the pinion in mesh with the rack, and a driving shaft operatively associated with said pinion.

4. A power transmitting device including, in combination, a cylindrical casing having a longitudinal slot, a cylindrical slide member rockable and slidable in the casing, a pair of arms, one attached to each end of the slide member and projecting through the slot, a frame attached to the casing and extending laterally therefrom, a rack frame formed with a continuous internal rack and pivotally engaged at its ends with the arms, and movable through the first mentioned frame, a pinion meshing with the rack, means for rotating the pinion, and means for holding said pinion in mesh with the rack.

5. A power transmitting device including, in combination, a cylindrical casing having a longitudinal slot, a cylindrical slide member rockable and slidable in the casing, a frame attached to the casing and extending laterally therefrom, a shaft journaled transversely in the frame, rollers on the shaft, a rack frame formed with a continuous rack, means for pivotally engaging the rack frame with the slide member, a plate secured to the rack frame and engageable with the rollers and having a longitudinal rail extending in the rack frame, a pinion meshing with the rack frame and formed with a roller extension engaging the rail.

6. A power transmitting device including, in combination, a cylindrical casing having a longitudinal slot, a cylindrical slide member rockable and slidable in the casing, a frame attached to the casing and extending laterally therefrom, a shaft journaled transversely in the frame, rollers on the shaft, a rack member formed with a continuous rack, means for pivotally engaging the rack frame with the slide member, a plate secured to the rack frame and engageable with the rollers and having a longitudinal rail extending in the rack frame, a pinion meshing with the rack frame and formed with a roller extension engaging the rail, a bearing on the first mentioned frame, a driving shaft journaled in the bearing and fixed to the pinion.

In testimony whereof I affix my signature.

JOHN A. NITCHIE.